United States Patent
Perkins et al.

(10) Patent No.: US 7,174,696 B2
(45) Date of Patent: Feb. 13, 2007

(54) MACHINE AND METHOD FOR INFLATING AND SEALING AIR-FILLED PACKING CUSHIONS

(75) Inventors: Andrew Perkins, Berkeley, CA (US); Oliver M. Reyes, Berkeley, CA (US)

(73) Assignee: Free-Flow Packaging International, Inc., Redwood City, CA (US)

( * ) Notice: Subject to any disclaimer, the term of this patent is extended or adjusted under 35 U.S.C. 154(b) by 785 days.

(21) Appl. No.: 10/087,897

(22) Filed: Mar. 1, 2002

(65) Prior Publication Data

US 2003/0163976 A1    Sep. 4, 2003

(51) Int. Cl.
*B65B 31/00*    (2006.01)
(52) U.S. Cl. ............................................. 53/403; 53/79
(58) Field of Classification Search .................. 53/403, 53/432, 79, 512; 156/145, 147; 428/178
See application file for complete search history.

(56) References Cited

U.S. PATENT DOCUMENTS

| 2,904,100 A | 9/1959 | Fener |
| 3,253,122 A | 5/1966 | Kochmer et al. |
| 3,262,833 A | 7/1966 | Zelnick |
| 3,359,703 A | 12/1967 | Quaadgras |
| 3,389,534 A | 6/1968 | Pendelton |
| 3,492,783 A | 2/1970 | Dohmeier |
| 3,554,135 A | 1/1971 | Duvall et al. |
| 3,575,757 A | 4/1971 | Smith |
| 3,660,189 A | 5/1972 | Troy |
| 3,667,593 A | 6/1972 | Pendleton |
| 3,674,614 A | 7/1972 | Templeton |
| 3,703,430 A | 11/1972 | Rich |
| 3,769,145 A | 10/1973 | Gresham et al. |
| 3,817,803 A | 6/1974 | Horskey |
| 3,868,285 A | 2/1975 | Troy |
| 3,889,743 A | 6/1975 | Presnick |
| 3,902,677 A * | 9/1975 | Wolf ........................... 242/542 |
| 3,938,298 A | 2/1976 | Luhman et al. |
| 4,017,351 A * | 4/1977 | Larson et al. ................ 156/145 |
| 4,021,283 A | 5/1977 | Weikert |
| 4,096,306 A * | 6/1978 | Larson ........................ 156/145 |

(Continued)

FOREIGN PATENT DOCUMENTS

DE    297 17 551 U1    3/1998

(Continued)

OTHER PUBLICATIONS

Claim from Application No. 10/031,111 (PCT/NL01/00351).

(Continued)

*Primary Examiner*—Louis Huynh
(74) *Attorney, Agent, or Firm*—Banner & Witcoff, Ltd.

(57) ABSTRACT

Machine and method for making air-filled packing cushions from a roll of prefabricated film material having a longitudinally extending inflation channel near one edge of the material and chambers which communicate with the channel through laterally extending passageways. The roll rests on a pair of spaced apart, horizontally extending rollers. The film material is fed from the roll to an inflation tube which extends into the inflation channel, air is introduced into the chambers through the inflation tube to inflate the cushions, and a longitudinally extending seal is formed across the passageways between the channel and the chambers after the cushions are inflated.

15 Claims, 4 Drawing Sheets

U.S. PATENT DOCUMENTS

| | | | |
|---|---|---|---|
| 4,169,002 A * | 9/1979 | Larson | 156/145 |
| 4,415,398 A | 11/1983 | Ottaviano | |
| 4,465,188 A | 8/1984 | Soroka et al. | |
| 4,551,379 A | 11/1985 | Kerr | |
| 4,564,407 A | 1/1986 | Tsuruta | |
| 4,586,319 A | 5/1986 | Ausnit | |
| 4,596,111 A | 6/1986 | Ambrose | |
| 4,680,073 A | 7/1987 | Brunner et al. | |
| 4,793,123 A | 12/1988 | Pharo | |
| 4,834,830 A | 5/1989 | Heeler et al. | |
| 4,847,126 A | 7/1989 | Yamashiro et al. | |
| 4,850,912 A | 7/1989 | Koyanagi | |
| 4,872,558 A | 10/1989 | Pharo | |
| 4,874,093 A | 10/1989 | Pharo | |
| 4,912,906 A | 4/1990 | Toner | |
| 4,918,904 A | 4/1990 | Pharo | |
| 4,936,079 A * | 6/1990 | Skalsky et al. | 53/389.4 |
| 4,941,754 A | 7/1990 | Murdock | |
| 4,949,530 A | 8/1990 | Pharo | |
| 4,981,006 A | 1/1991 | Caenazzo et al. | |
| 5,009,318 A | 4/1991 | Lepinoy | |
| 5,046,258 A | 9/1991 | Cahill et al. | |
| 5,203,761 A | 4/1993 | Reichental et al. | |
| 5,216,868 A | 6/1993 | Cooper et al. | |
| 5,340,632 A | 8/1994 | Chappuis | |
| 5,402,892 A | 4/1995 | Jaszai | |
| 5,406,770 A | 4/1995 | Fikacek | |
| 5,427,830 A | 6/1995 | Pharo | |
| 5,447,235 A | 9/1995 | Pharo | |
| 5,454,642 A | 10/1995 | De Luca | |
| 5,535,888 A | 7/1996 | De Luca | |
| 5,552,003 A | 9/1996 | Hoover et al. | |
| 5,575,435 A | 11/1996 | Sperry et al. | |
| 5,581,983 A * | 12/1996 | Murakami | 53/79 |
| 5,604,016 A | 2/1997 | Allegre | |
| 5,651,237 A | 7/1997 | De Luca | |
| 5,658,632 A | 8/1997 | Krabill | |
| 5,660,662 A * | 8/1997 | Testone | 156/145 |
| 5,692,833 A | 12/1997 | De Luca | |
| 5,693,163 A | 12/1997 | Hoover et al. | |
| 5,755,082 A | 5/1998 | Takahashi et al. | |
| 5,755,328 A | 5/1998 | De Luca | |
| 5,824,392 A * | 10/1998 | Gotoh et al. | 428/178 |
| 5,858,153 A | 1/1999 | Mack | |
| 5,873,215 A * | 2/1999 | Aquarius et al. | 53/403 |
| 5,937,614 A * | 8/1999 | Watkins et al. | 53/79 |
| 5,942,076 A | 8/1999 | Salerno et al. | |
| RE36,501 E | 1/2000 | Hoover et al. | |
| 6,015,047 A | 1/2000 | Greenland | |
| 6,209,286 B1 | 4/2001 | Perkins et al. | |
| 6,272,815 B1 | 8/2001 | Todd et al. | |
| 6,342,118 B1 | 1/2002 | Ward | |
| 6,375,785 B1 | 4/2002 | Aquarius | |
| 6,410,119 B1 * | 6/2002 | De Luca et al. | 428/178 |
| 6,423,166 B1 * | 7/2002 | Simhaee | 53/79 |
| 6,460,313 B1 | 10/2002 | Cooper | |
| 6,582,800 B2 | 6/2003 | Fuss et al. | |
| 6,659,150 B1 | 12/2003 | Perkins et al. | |
| 6,786,022 B2 | 9/2004 | Fuss et al. | |
| 2001/0013215 A1 | 8/2001 | Fuss et al. | |
| 2003/0118778 A1 | 6/2003 | Perkins et al. | |
| 2004/0206050 A1 | 10/2004 | Fuss et al. | |

FOREIGN PATENT DOCUMENTS

| | | |
|---|---|---|
| DE | 199 13 408 A1 | 10/2000 |
| DE | 199 13 408 C2 | 10/2000 |
| EP | 0836926 A2 | 4/1998 |
| FR | 2389547 | 12/1978 |
| FR | 2580597 | 10/1986 |
| FR | 2678897 | 1/1993 |
| GB | 2218401 | 11/1989 |
| JP | 7/16961 | 1/1995 |
| JP | 7/165267 | 6/1995 |
| WO | WO 94/07678 | 4/1994 |
| WO | WO 98/40276 | 9/1998 |
| WO | WO 99/58324 | 11/1999 |
| WO | WO 00/43198 | 7/2000 |
| WO | WO 00/43270 | 7/2000 |
| WO | WO 00/53501 | 9/2000 |
| WO | WO 00 64672 | 11/2000 |
| WO | WO 01/85434 A2 | 11/2001 |
| WO | WO 02/14156 A1 | 2/2002 |
| WO | WO 02/055288 A2 | 7/2002 |

OTHER PUBLICATIONS

Fuss and Yampolsky declaration from U.S. Appl. No. 09/488,622.

Air-Fil 1200 photographs (no date but prior to application's filing date).

Claims from U.S. Appl. No. 10/929,353.

* cited by examiner

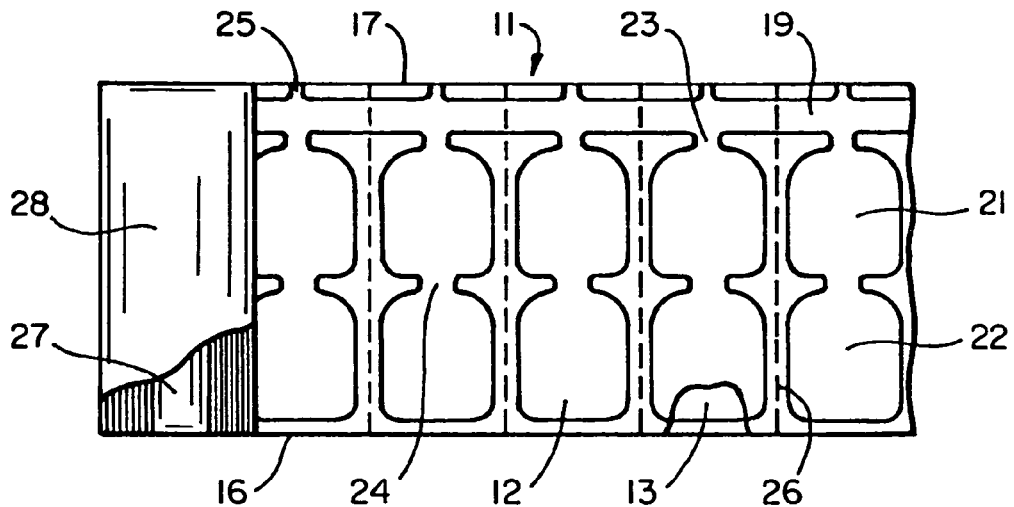
FIG_1
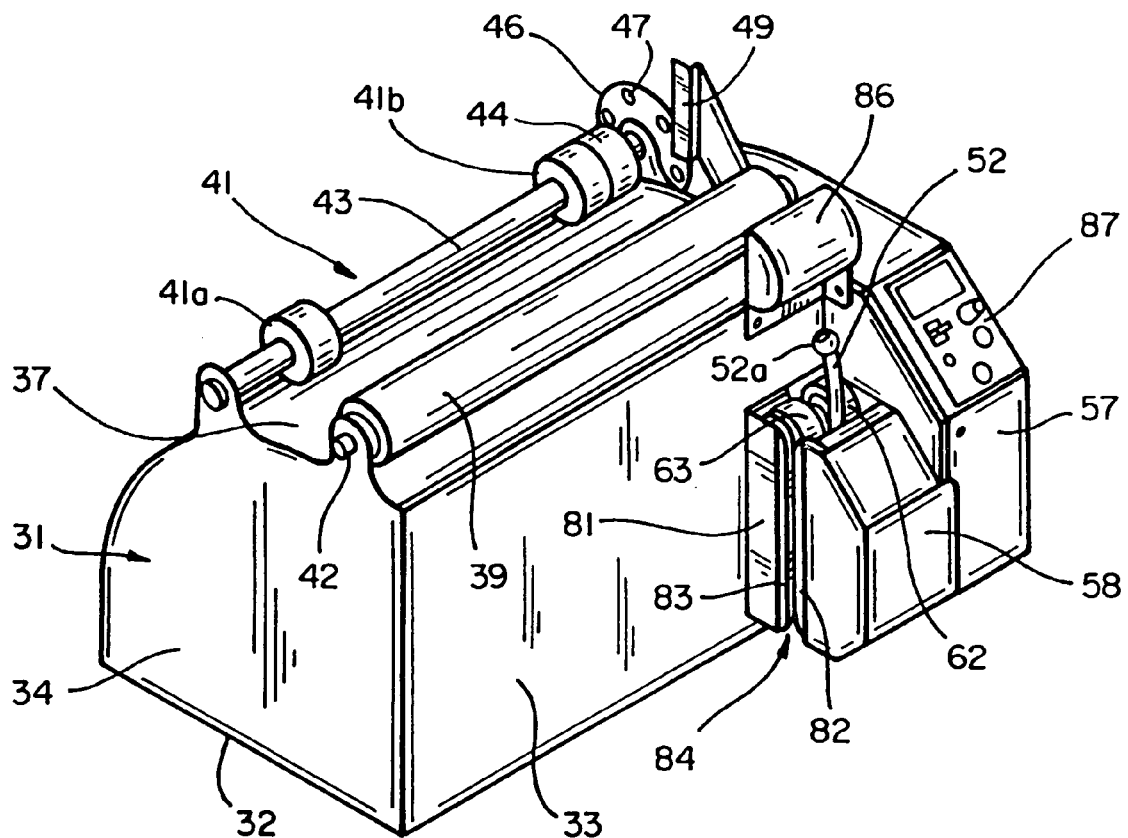
FIG_2

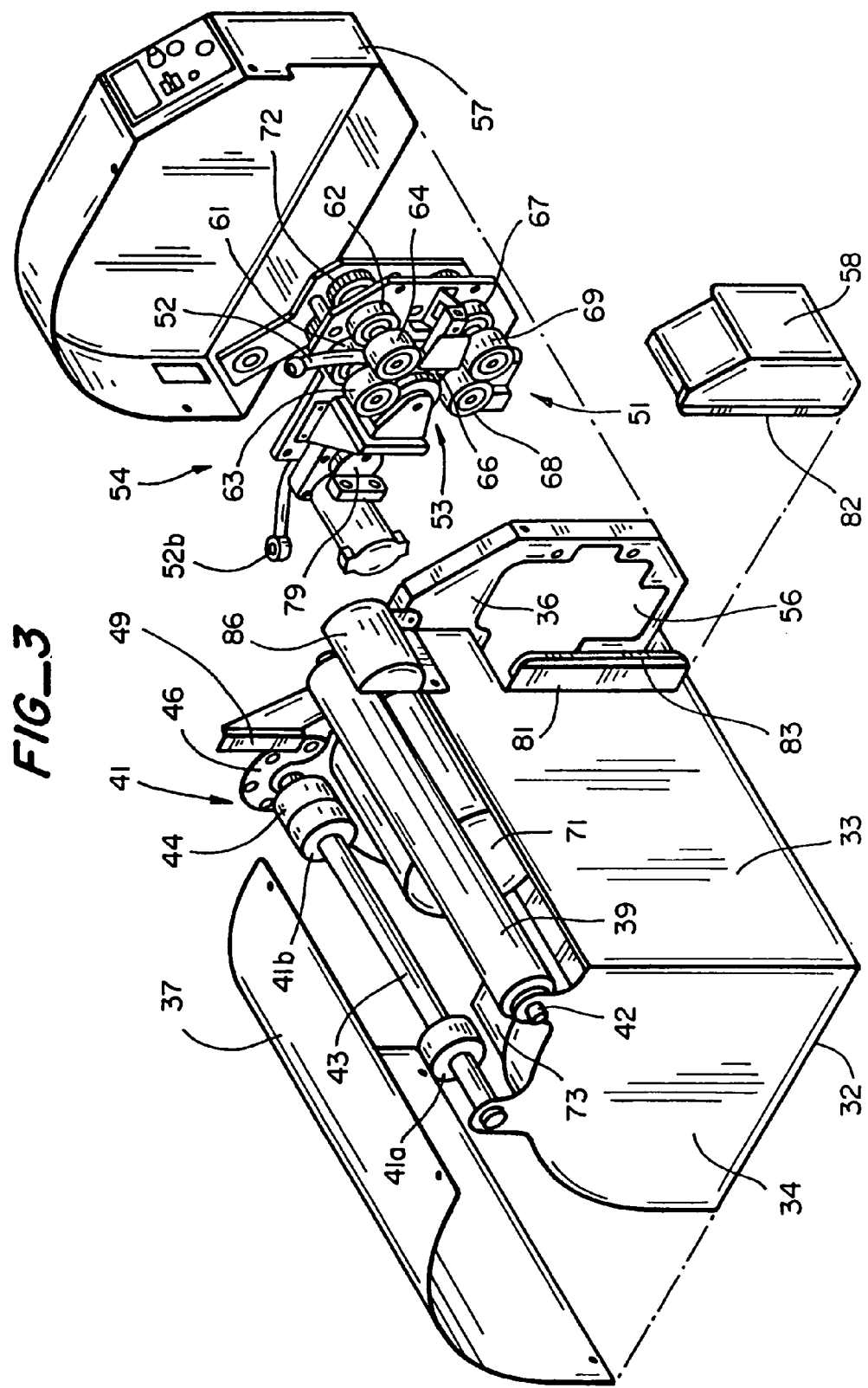
FIG_3

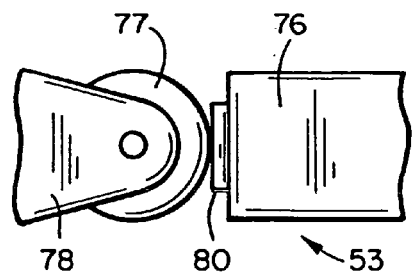
FIG_4
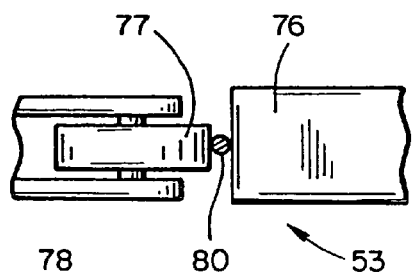
FIG_5
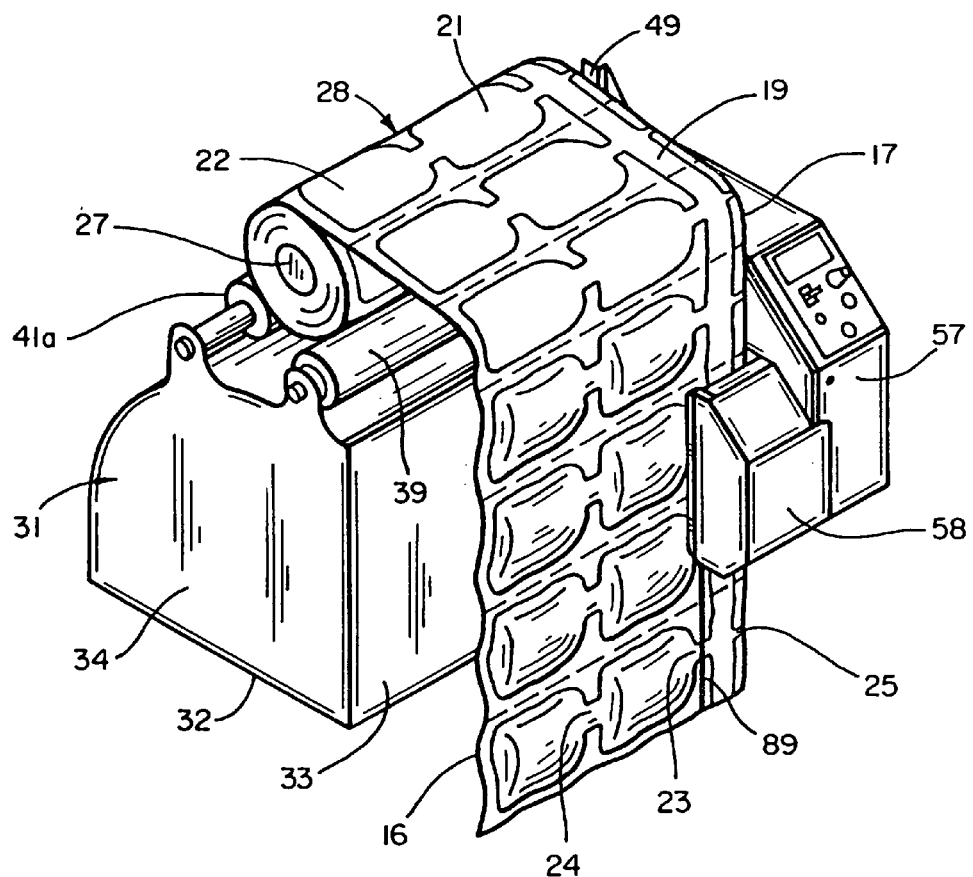
FIG_6

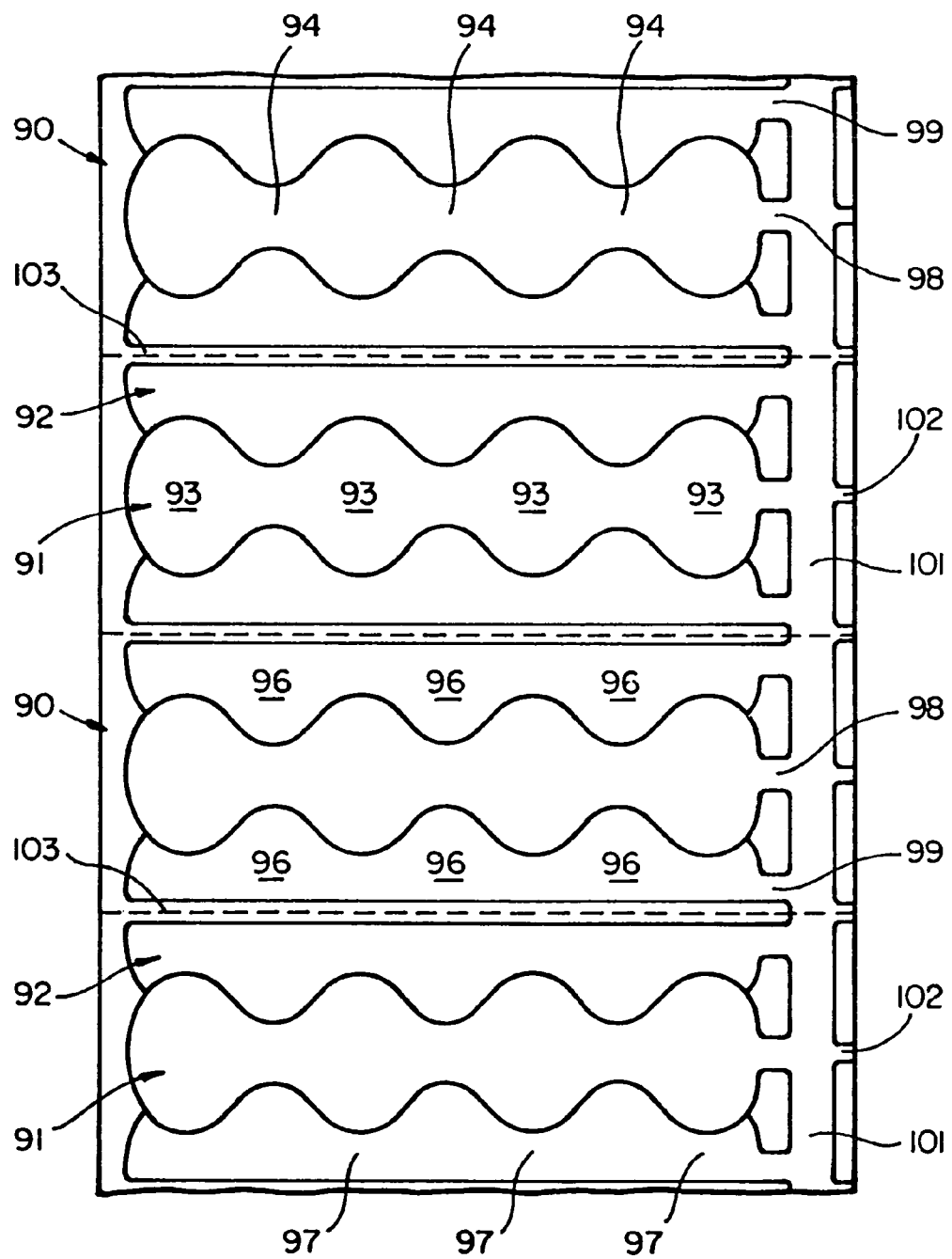
FIG_7

MACHINE AND METHOD FOR INFLATING AND SEALING AIR-FILLED PACKING CUSHIONS

BACKGROUND OF THE INVENTION

1. Field of Invention

This invention pertains generally to packing materials and, more particularly, to a machine and method for making air-filled packing cushions.

2. Related Art

Air-filled pillows or cushions are currently used as a packing material and void filler in shipping cartons and the like. Such cushions typically have two layers of plastic film material which are sealed together to form chambers that are filled with air. The cushions are usually made in continuous strings, with perforations between successive ones of the cushions so they can be torn apart.

Although very light in weight, air-filled cushions do take up a substantial amount of space, and to reduce the volume of material which must be shipped and stored, such cushions are commonly made at or near the point of use. To avoid the need for packers and shippers to have large, complex cushion making machines in their facilities, suppliers of air-filled packing cushions provide their customers with prefabricated film materials in which the major seals and perforations have already been formed. Those materials usually wound into rolls or folded into boxes for shipment and storage.

Packers and shippers who use the prefabricated film materials are also provided with relatively simple, inexpensive machines for inflating and sealing the materials to complete the cushions at or near the point of use. Examples of such machines are found in U.S. Pat. No. 6,209,286 and in copending Ser. Nos. 09/638,843 and 09/717,782, the disclosures of which are incorporated herein by reference.

OBJECTS AND SUMMARY OF THE INVENTION

It is in general an object of the invention to provide a new and improved machine and method for making air-filled packing cushions.

Another object of the invention is to provide a machine and method of the above character which overcome the limitations and disadvantages of the prior art.

These and other objects are achieved in accordance with the invention by providing a machine and method for making air-filled packing cushions from a roll of prefabricated film material having two layers which are sealed together to form a longitudinally extending inflation channel near one edge of the material, rows of chambers extending across the material, flow passageways interconnecting the chambers in each of the rows, and inlet passageways extending between the inlet channel and one of the chambers in each of the rows.

The roll rests on a pair of spaced apart, horizontally extending rollers. The film material is fed from the roll to an inflation tube which extends into the inflation channel, air is introduced into the chambers through the inflation tube to inflate the cushions, and a longitudinally extending seal is formed across the passageways between the channel and the chambers after the cushions are inflated.

FIG. 1 is a plan view, partly broken away, of one embodiment of a prefabricated film material for use in making air-filled packing cushions in accordance with the invention.

FIG. 2 is an isometric view of one embodiment of a machine for inflating and sealing air-filled packing cushions in accordance with the invention.

FIG. 3 is an exploded isometric view of the embodiment of FIG. 2.

FIG. 4 is an operational view of the embodiment of FIG. 2, illustrating the transformation of a prefabricated film material into air-filled packing cushions.

FIG. 5 is a fragmentary side elevational view of the sealing unit in the embodiment of FIG. 2.

FIG. 6 is a fragmentary cross-sectional view of the sealing unit of FIG. 5.

FIG. 7 is a plan view of another embodiment of a prefabricated film material for use in making air-filled packing cushions in accordance with the invention.

DETAILED DESCRIPTION

The prefabricated film material 11 shown in FIG. 1 consists of two layers 12, 13 of a suitable film material such as high density polyethylene or low density polyethylene. The material can be in the form of a flattened tubing which is joined together, or closed, along both of its longitudinal edges 16, 17, or it can be open along one or both edges. In the embodiment illustrated, a single elongated sheet, or strip, of film material is folded along its centerline to form edge 16. That edge is closed, and edge 17 is open.

The two layers of film are sealed together to form an inflation channel 19 and inflatable chambers 21, 22. The channel extends longitudinally near one edge of the material, and the chambers are arranged in pairs which are positioned side-by-side across the material. Inlet passageways 23 extend between the inflation channel and one of the chambers in each pair, and passageways 24 interconnect the chambers. Outlet passageways 25 extend between the inflation channel and the open edge 17 of the material.

Each row or pair of chambers forms a single cushion in the finished product. These cushions and other cushions with two or more interconnected chambers have been found to provide better cushioning and shock absorption in some applications than cushions with just one chamber do. With the interconnected chambers, air can shift from chamber to chamber as pressure is applied to different portions of the cushion.

Transverse rows of perforations 26 extend across the tubing between the chambers of successive cushions to facilitate separation of the material either before or after the chambers are inflated to form the cushions.

The prefabricated film material is wound onto a cylindrical core 27 to form a roll 28 for shipment and storage.

FIG. 2 illustrates is a compact, self-contained machine for inflating and sealing a prefabricated film material in accordance with the invention. This machine has a relatively small cabinet 31 which is adapted to rest on a table top or other supporting surface. The cabinet has an L-shaped base 32 with an upstanding front wall 33, end walls 34, 36 and a removable cover 37 for the top and rear sides of the cabinet.

A pair of spaced apart, horizontally extending rollers 39, 41 are mounted on the upper side of the cabinet for receiving the roll of prefabricated film material. The roll rests on the rollers and is free to rotate as the material is drawn from it. The gap between the rollers is less than the diameter of the core so that the roll will not drop between the rollers as it decreases in size. If desired, the axis of one or both of the rollers can be inclined slightly, i.e., up to about 10 degrees, in order to keep the roll against a stop toward one side of the machine.

Roller 39 is rotatively mounted on a stationary shaft 42 which extends between end walls 34, 36 near the front the cabinet. Roller 41 consists of two relatively short rollers 41a, 41b which are mounted on a rotatively mounted shaft 43 to the rear of roller 39. The two rollers are positioned toward opposite sides of the machine for engagement with the roll of film material toward the edges of the roll. A nip roller 44 is mounted on shaft 43 next to roller 41b and directly beneath inflation channel 19 in the prefabricated film. A timing disk 46 is also mounted on shaft 43, with openings 47 which are detected optically to monitor rotation of the roll and the removal of material from it.

A stop 49 located toward one side of the cabinet serves as a guide for positioning the roll on the rollers. The roll is placed on the rollers with the edge adjacent to the inflation channel abutting against the stop so that the channel and the inlet passageways will always be in the same position regardless of the width of the roll. As noted above, one or both of the rollers can be inclined down toward the side of the cabinet where the stop is located to help keep the roll against the stop. With one or both of the rollers inclined in this manner, they are still substantially horizontal, and the axis of the roll is still substantially parallel to the axes of the rollers. The roll can be of any desired width, and it can even overhang the side of the cabinet opposite the stop as long as it is not so wide that the weight of the overhang causes the roll to tip or be unstable on the rollers.

A drive mechanism 51, an inflation tube 52 and a sealing assembly 53 are combined into a single modular unit 54 which is located toward the front of the machine. As best seen in FIG. 3, this unit is removably mounted on the outer side of end wall 36, and projects through an opening 56 in that wall, with an end cover 57 and a front cover 58 enclosing portions of it.

The drive mechanism includes input rollers 61–64 and output rollers 66–69 which engage the edge portion of the film material and feed it through the machine. The input and output rollers are arranged in dual sets for engaging the film material on opposite sides of the inflation channel. Thus, input rollers 61, 62 and output rollers 66, 67 engage the film material between the inflation channel and the edge of the material, whereas input rollers 63, 64 and output rollers 68, 69 engage it between the channel and the chambers.

The feed rollers are driven by a motor 71 which is mounted inside the cabinet, with a drive gear on the motor shaft (not shown) driving gears 72 which are affixed to the shafts on which the rollers are mounted. The gearing is such that the output rollers rotate slightly faster than the input rollers (e.g., an 8:7 ratio) in order to tension the film material and maintain better control of it as it passes through the sealing assembly.

Inflation tube 52 is positioned between the inner and outer feed rollers and extends in an upward direction, curving inwardly as it does, for insertion into the inflation channel of the film material. Air is supplied to the tube at a pressure on the order of 0.5 to 10 psig by an air pump 73 which is also mounted inside the cabinet. If desired, a regulator (not shown) can be connected between the pump and the air tube to allow users to adjust the air pressure and, hence, the degree of firmness to which the cushions are inflated.

An enlarged bulb 52a at the upper end of the air tube facilitates movement of the film material over the end portion of the tube and also helps to prevent air from escaping back along the tube from the inflation channel. A fitting 52b is provided at the other end of the tube for connection to the air pump.

Sealing assembly 53 is positioned between the input and output rollers and includes a heating element 76 and a roller 77 which presses the film material against the heating element. The heating element is mounted in a stationary position, and the roller is mounted on a carriage 78. The roller is pressed against the heating element by a cam 79 when the machine is operating, and withdrawn from the heating element by springs when the machine is idle.

As best seen in FIGS. 4–5, the heating element comprises a stainless steel rod 80 of relatively small diameter which extends vertically, so that it is parallel to the direction of film travel and perpendicular to the axis of roller 77. Thus, the curved surfaces of the heating element and the roller come together at a very small point, so that a given point on the film material is in contact with the heating element for only about one millisecond. With that brief contact, higher heating element temperatures can be used, which results in better seals than are possible with the prior art.

Sealing assembly 53 is somewhat similar to the sealing unit shown in Ser. No. 09/648,843, the disclosure of which is incorporated herein by reference. There, however, the heating element consists of a pair of Nichrome wires which are covered with Teflon tape that prevents the film material from contacting the wires directly. Consequently, the film material is not heated to as high a temperature as it is in the present invention where the it makes direct contact with the actual heating element. Also, in the unit shown in Ser. No. 09/648,843, the roller is mounted in a fixed position, and the heating element is withdrawn from the roller by a pneumatic actuator.

Cover 58 terminates just in front of the path traveled by the film material in passing through the feed rollers and sealing assembly, and a flange 81 which extends from the front wall of the cabinet in alignment with the left side of the cover terminates just to the rear of the film path. Guide shoes 82, 83 are mounted on the confronting edges of the cover and flange to define an access opening 84 for the film material and to help guide the material into the feed rollers. Another guide 86 is positioned toward the front of the cabinet above the air tube and feed rollers to guide the film material toward them.

A control panel 87 is located on an inclined portion of end cover 57 to the right of the drive module. This panel includes controls for turning the machine on and off and for controlling various operational functions such as number and firmness of cushions being made.

Operation and use of the machine, and therein the method of the invention, can best be described with reference to FIG. 6. The roll of prefabricated film material 28 is placed on rollers 39, 41, with the inflation channel side of the roll 28 abutting against stop 49, so that the inflation channel 19 is aligned with nip roller 44 and inflation tube 52.

The free end of the film material is pulled down over guide 86 and onto the inflation tube, with the tube extending into inflation channel 19. The operator continues to pull down on the material until it engages the upper feed rollers and is thereafter fed by the rollers. The air tube serves as a guide for keeping the film material properly aligned with the rollers, and the curvature of the tube helps to guide the material into the rollers.

As the film material travels along the air tube, the air injected through the tube flows through passageways 23, 24 and into chambers 21, 22 in the portion of the film between the roll and the tube, thereby inflating the cushions. The air is confined primarily to this portion of the film by constriction of the inflation channel as it passes around the roll and is pinched closed by nip roller 44. Depending upon the diameter of the roll, the film material is withdrawn from the roll about 90 to 180 degrees from the point where the inflation channel is pinched closed by the roller. With the inflation channel closed down in this manner, the cushions are inflated more efficiently and more uniformly than in systems where the air diffuses into substantial portions of the film material upstream of the filling and sealing units.

Following inflation, the film material travels through sealing assembly 53 where roller 77 presses the material into direct contact with heating element 76. The two layers of film material are thus fused together along a relatively narrow seal line 89 which extends longitudinally of the film material and across inlet passageways 23 to seal the chambers.

After a cushion is inflated and sealed, the film material travels past a knife (not shown) which slits open the edge of the material next to the inflation channel so the air tube can exit from the channel.

In the film material illustrated in FIG. 7, each cushion 90 has one full-size chamber 91 and two half-size chambers 92. The full-size chamber has four sections 93 which are positioned side-by-side across the film material, with passageways 94 between them. Each half-size chamber has three sections 96, with passageways 97 between them.

Inlet passageways 98, 99 extend laterally between a longitudinally extending inflation channel 101 and the first section in each of the chambers, and outlet passageways 102 extend between the inflation channel and the adjacent edge of the film material. Perforations 103 are provided between the cushions for use in separating them.

The film material of FIG. 7 is processed into cushions in exactly the same way as the material of FIG. 1. It is fed through the machine by feed rollers 61–69, with inflation tube 52 extending into inflation channel 101 to deliver air for inflating the cushions, and sealing assembly 53 forming a longitudinally extending seal across inlet passageways 98, 99 to seal the inflated cushions.

With the feed rollers and the inflation tube engaging only one edge portion of the film material, the machine can process materials of any desired width to make cushions having any desired number of chambers, including cushions having a single chamber that extends the full width of the material.

It is apparent from the foregoing that a new and improved machine and method for inflating and sealing air-filled packing cushions have been provided. While only certain presently preferred embodiments have been described in detail, as will be apparent to those familiar with the art, certain changes and modifications can be made without departing from the scope of the invention as defined by the following claims.

The invention claimed is:

1. In a method of making air-filled packing cushions from a roll of prefabricated film material having two layers which are sealed together to form a longitudinally extending channel near one edge of the material, a plurality of chambers to one side of the channel, and inlet passageways extending laterally between the longitudinally extending channel and the chambers, the steps of:
   resting the roll of film material on a pair of spaced apart, horizontally extending rollers;
   feeding the film material from the roll in a downward direction to an air injector which is positioned to direct air into the chambers;
   introducing air into the chambers through the injector to inflate the cushions; and
   forming a longitudinally extending seal across the inlet passageways after the cushions are inflated.

2. The method of claim 1 wherein the longitudinally extending channel is pinched closed by one of the rollers, and air is injected into the longitudinally extending channel in a portion of the material which has been withdrawn from the roll, with the air in the longitudinally extending channel flowing around the roll only to the point where the channel is pinched closed by the roller.

3. The method of claim 2 wherein the film material is withdrawn from the roll about 90 to 180 degrees from the point where the longitudinally extending channel is pinched closed by the roller.

4. A machine for making air-filled packing cushions from a roll of prefabricated film material having two layers which are sealed together to form a longitudinally extending channel near one edge of the material, a plurality of chambers to one side of the channel, and inlet passageways extending laterally between the longitudinally extending channel and the chambers, comprising:
   a pair of spaced apart, horizontally extending rollers on which the roll of film material rests;
   an air injector which is connected to a source of air, positioned below the rollers, and extends in an upward direction for injecting air into the chambers to inflate the cushions;
   a sealing unit for forming a longitudinally extending seal across the inlet passageways after the cushions are inflated; and
   a feed mechanism for withdrawing the film material in a generally downward direction from the roll past the air injector and the sealing unit.

5. The machine of claim 4 wherein the sealing unit includes a cylindrical heating element and a wheel which are urged together, with the axis of the heating element being perpendicular to the axis of the wheel and the heating element being exposed for direct contact with the film material.

6. The machine of claim 5 wherein the heating element comprises a stainless steel rod.

7. The machine of claim 4 wherein the longitudinally extending channel is pinched closed by one of the rollers, and the air injector comprises an inflation tube which is positioned for injecting air into the longitudinally extending channel in a portion of the material which has been withdrawn from the roll, with the air in the longitudinally extending channel flowing around the roll only to the point where the channel is pinched closed by the roller.

8. The machine of claim 7 wherein the film material is withdrawn from the roll about 90 to 180 degrees from the point where the longitudinally extending channel is pinched closed by the roller.

9. The machine of claim 4 wherein the air injector comprises an inflation tube which extends into the longitudinally extending channel, and the feed mechanism includes dual feed rollers positioned on opposite sides of the inflation tube for engagement with the film material on opposite sides of the longitudinally extending channel.

10. In a machine for inflating and sealing air-filled packing cushions:
   a roll of prefabricated film material having two layers which are sealed together to form a longitudinally extending channel near one edge of the material, rows of chambers extending across the material, flow passageways interconnecting the chambers in each of the rows, and inlet passageways extending between the longitudinally extending channel and one of the chambers in each of the rows;

a pair of spaced apart, horizontally extending rollers on which the roll of film material rests;

an air injector which is connected to a source of air, positioned below the rollers, and extends in an upward direction for injecting air into the chambers to inflate the cushions;

a sealing unit for forming a longitudinally extending seal across the inlet passageways after the cushions are inflated; and a feed mechanism for withdrawing the film material in a generally downward direction from the roll past the air injector and the sealing unit.

11. The machine of claim 10 wherein the sealing unit includes a cylindrical heating element and a wheel which are urged together, with the axis of the heating element being perpendicular to the axis of the wheel and the heating element being exposed for direct contact with the film material.

12. The machine of claim 11 wherein the heating element comprises a stainless steel rod.

13. A table-top machine for making air-filled packing cushions from a roll of prefabricated film material having a longitudinally extending channel and a plurality of chambers which communicate with the channel through laterally extending inlet passageways;

a cabinet which is adapted to rest on a relatively small horizontal supporting surface;

a pair of spaced apart, horizontally extending rollers on the upper side of the cabinet for receiving the roll of film material in such manner that the roll rests on the rollers;

a feed mechanism positioned toward the front of the cabinet for withdrawing the film material from the roll in a downward direction;

an elongate member extending in an upward direction from the feed mechanism and adapted to be received in the longitudinally extending channel of the film material that is withdrawn from the roll;

a source of air within the cabinet connected to an air injector for introducing air into the chambers to inflate the cushions; and a sealing unit for forming a longitudinally extending seal in the film material between the longitudinally extending channel and the cushions to close the inlet passageways after the cushions have been inflated.

14. The table-top machine of claim 13 wherein the sealing unit includes a cylindrical heating element and a wheel which are urged together, with the axis of the heating element being perpendicular to the axis of the wheel and the heating element being exposed for direct contact with the film material.

15. The table-top machine of claim 14 wherein the heating element comprises a stainless steel rod.

* * * * *